US008851501B2

(12) United States Patent
Keatley

(10) Patent No.: US 8,851,501 B2
(45) Date of Patent: Oct. 7, 2014

(54) FIFTH WHEEL HITCH ASSEMBLY WITH LOCK TIMING ASSEMBLY

(71) Applicant: SAF-Holland, Inc., Zeeland, MI (US)

(72) Inventor: Justin D. Keatley, Zeeland, MI (US)

(73) Assignee: SAF-Holland, Inc., Holland, MI (US)

( * ) Notice: Subject to any disclaimer, the term of this patent is extended or adjusted under 35 U.S.C. 154(b) by 0 days.

(21) Appl. No.: 13/671,088

(22) Filed: Nov. 7, 2012

(65) Prior Publication Data
US 2013/0307247 A1 Nov. 21, 2013

Related U.S. Application Data

(60) Provisional application No. 61/557,126, filed on Nov. 8, 2011.

(51) Int. Cl.
B62D 53/06 (2006.01)
B62D 53/08 (2006.01)
B60D 1/01 (2006.01)

(52) U.S. Cl.
CPC .................................... B60D 1/015 (2013.01)
USPC ..................... 280/433; 280/441.1; 280/423.1; 280/434; 280/435; 280/436

(58) Field of Classification Search
USPC ............ 280/433, 441.1, 423.1, 434, 435, 436
See application file for complete search history.

(56) References Cited

U.S. PATENT DOCUMENTS

| 4,659,101 | A | * | 4/1987 | Buckley | 280/434 |
| 5,257,796 | A | * | 11/1993 | Thorwall et al. | 280/434 |
| 5,988,666 | A | * | 11/1999 | Flater | 280/434 |
| 6,095,544 | A | * | 8/2000 | Flater | 280/434 |
| 6,520,527 | B2 | * | 2/2003 | Laarman | 280/437 |
| 7,770,910 | B1 | * | 8/2010 | Shirk, Jr. | 280/433 |
| 8,210,558 | B2 | * | 7/2012 | Mann et al. | 280/437 |
| 2006/0103109 | A1 | * | 5/2006 | Flater | 280/433 |

* cited by examiner

Primary Examiner — Joseph M Rocca
Assistant Examiner — Marlon Arce
(74) Attorney, Agent, or Firm — Price Heneveld LLP

(57) ABSTRACT

The latch assembly of a fifth wheel hitch plate comprises a latch member movable between lock and unlocked positions, a plunger member movable between engaged and unengaged positions, an actuator movable between coupled and uncoupled positions, a locking member movable between first and second positions, and a biasing member that biases the locking member from the disengaged position to the engaged position, wherein the latch member abuts the locking member as the latch member is moved from the unlocked position to the locked position, thereby moving the locking member from the first position to the second position.

16 Claims, 10 Drawing Sheets

FIFTH WHEEL HITCH ASSEMBLY WITH LOCK TIMING ASSEMBLY

BACKGROUND OF THE INVENTION

Various types of fifth wheel hitches have been developed to releasably couple a kingpin to a fifth wheel hitch. The present inventive fifth wheel hitch assembly provides a mechanism for timing the actuation of the various components of a kingpin latch locking assembly.

BRIEF SUMMARY OF THE INVENTION

One aspect of the present invention is a latch assembly adapted to operably couple to a fifth wheel hitch plate and adapted to engage a kingpin, the latch assembly including a latch member movable between a locked position, wherein the latch member is adapted to retain the kingpin within a relief of the fifth wheel hitch plate, and an unlocked position, wherein the kingpin may be removed from within the relief of the fifth wheel hitch plate, and a plunger member movable between an engaged position, wherein the plunger member engages the latch member, thereby preventing the latch member from being moved from the locked position to the unlocked position, and an engaged position, wherein the latch member may be moved from the locked position to the unlocked position. The latch assembly further includes an actuator assembly movable between a coupled position, wherein the actuator assembly moves the plunger member to the engaged position, and a coupling position, wherein the actuator member moves the plunger member to the disengaged position, and a locking member movable between a first position, wherein the locking member engages the plunger member, thereby preventing the plunger member from being moved from the disengaged position to the engaged position, and a second position wherein the locking member is disengaged from the plunger member allowing the plunger member to be moved from the disengaged position to the engaged position. The latch assembly still further includes a biasing member that biases the locking member from the disengaged position to the engaged position. The latch member abuts the locking member as the latch member is moved from the locking position to the locked position, thereby moving the locking member from the first position to the second position.

Another aspect of the present invention is to provide a fifth wheel hitch assembly that includes a fifth wheel hitch plate having a relief adapted to receive a kingpin therein, and a latch assembly operably coupled to the fifth wheel hitch plate and adapted to engage the kingpin. The latch assembly includes a latch member movable between a locked position, wherein the latch member retains the kingpin within the relief of the fifth wheel hitch plate, and an unlocked position, wherein the kingpin may be removed from within the relief of the fifth wheel hitch plate, and a plunger member movable between an engaged position, wherein the plunger member engages the latch member, thereby preventing the latch member from being moved from the locked position to the unlocked position, and an unengaged position, wherein the latch member may be moved from the locked position to the unlocked position. The latch assembly further includes an actuator assembly movable between a coupled position, wherein the actuator assembly moves the plunger member to the engaged position, and a coupling position, wherein the actuator assembly moves the plunger member to the disengaged position, and a locking member movable between a first position, wherein the locking member engages the plunger member, thereby preventing the plunger member from being moved from the disengaged position to the engaged position, and a second position, wherein the locking member is disengaged from the plunger member allowing the plunger member to be moved from the disengaged position to the engaged position. The latch assembly further comprises a biasing member that biases the locking member from the disengaged position to the engaged position. The latch member abuts the locking member as the latch member is moved from the unlocked position to the locked position, thereby moving the locking member from the first position to the second position.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Figure 1:
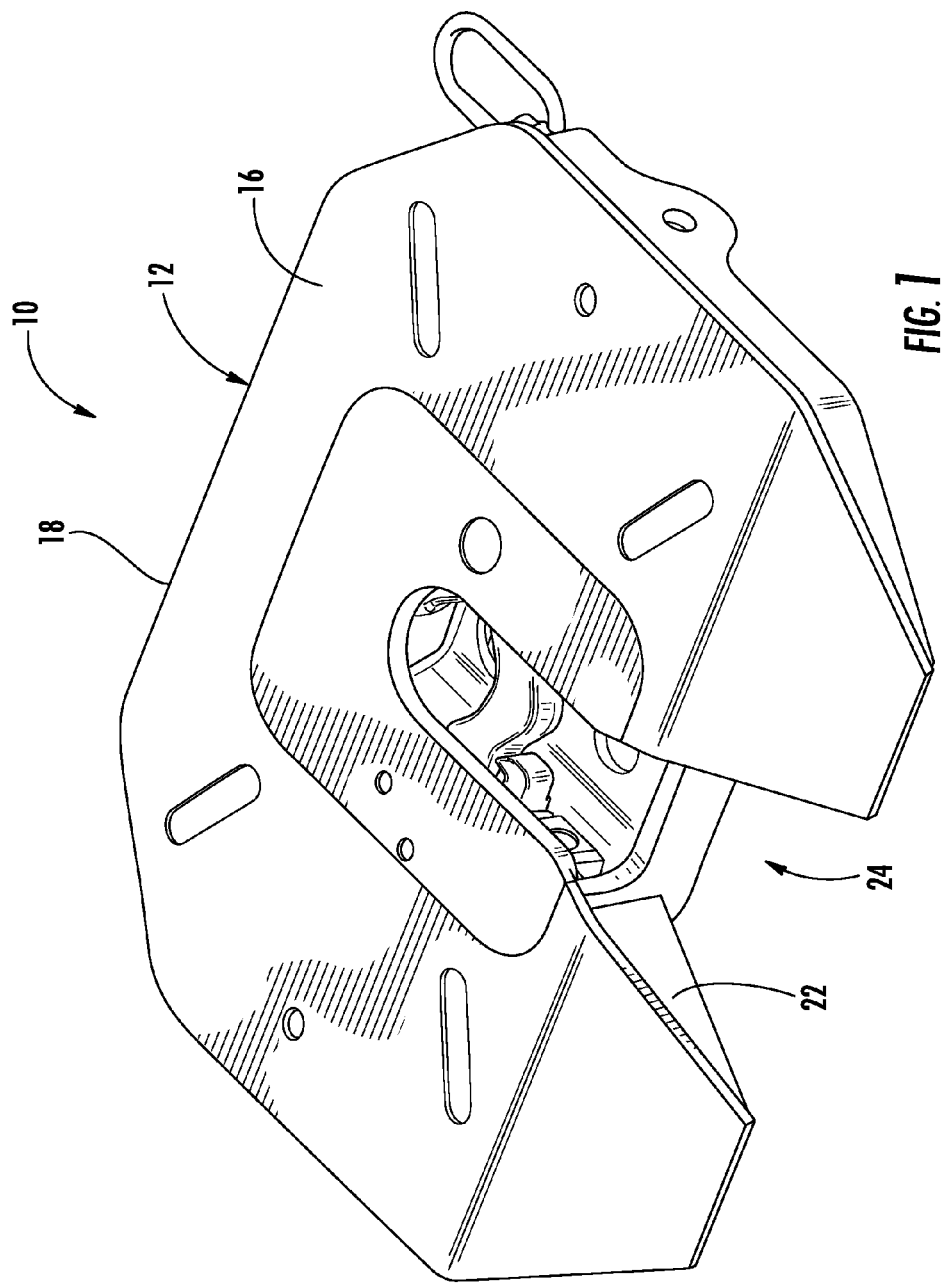
FIG. 1 is a top perspective view of the fifth wheel hitch assembly embodying the present invention.
Figure 3:
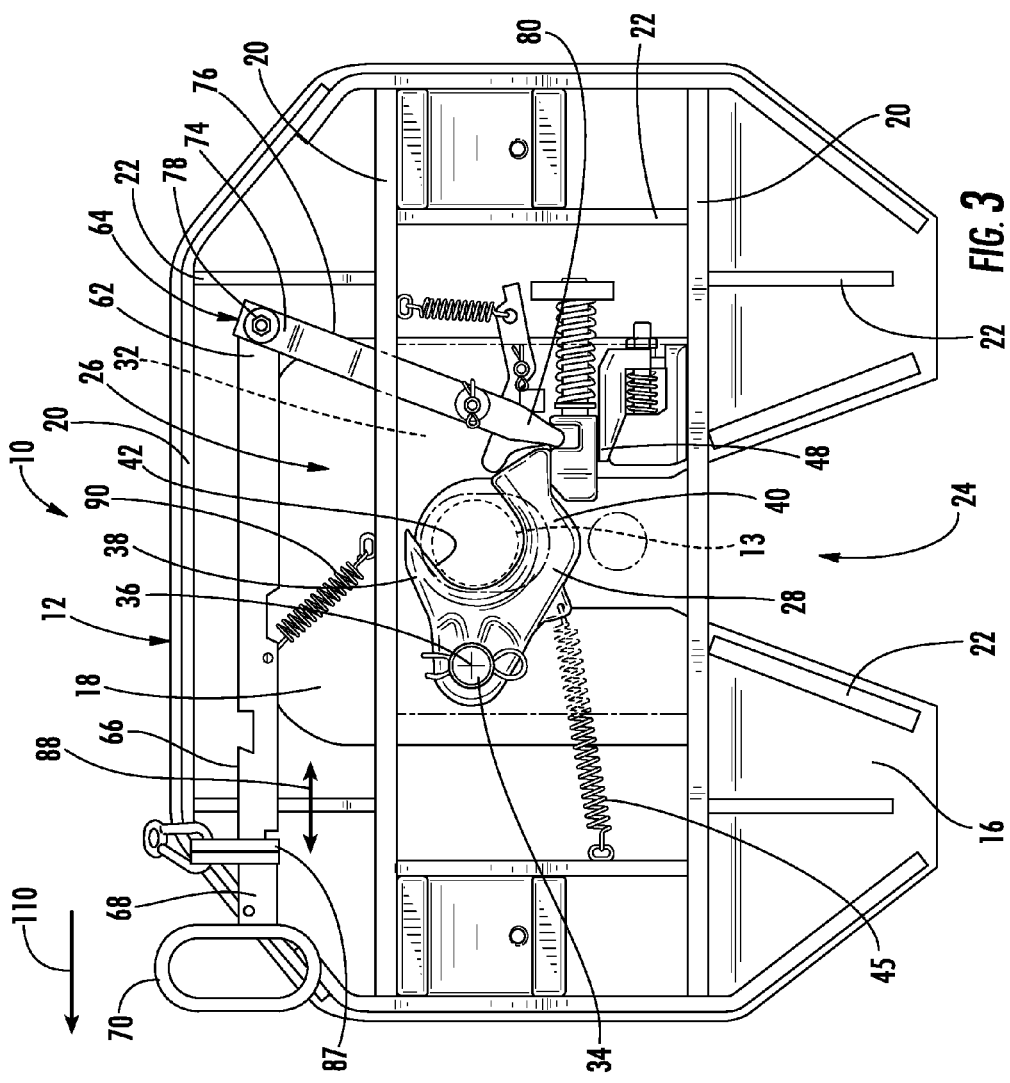
FIG. 3 is a bottom plan view of the fifth wheel hitch assembly.

For purposes of description herein, the terms "upper," "lower," "right," "left," "rear," "front," "vertical," "horizontal," and derivatives thereof shall relate to the invention as oriented in FIGS. 1 and 3. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other characteristics relating to the embodiments disclosed herein are not to be considered as limiting, unless the claims expressly state otherwise.

The reference numeral 10 (FIG. 1) generally designates a fifth wheel hitch assembly embodying the present invention.

Figure 2:
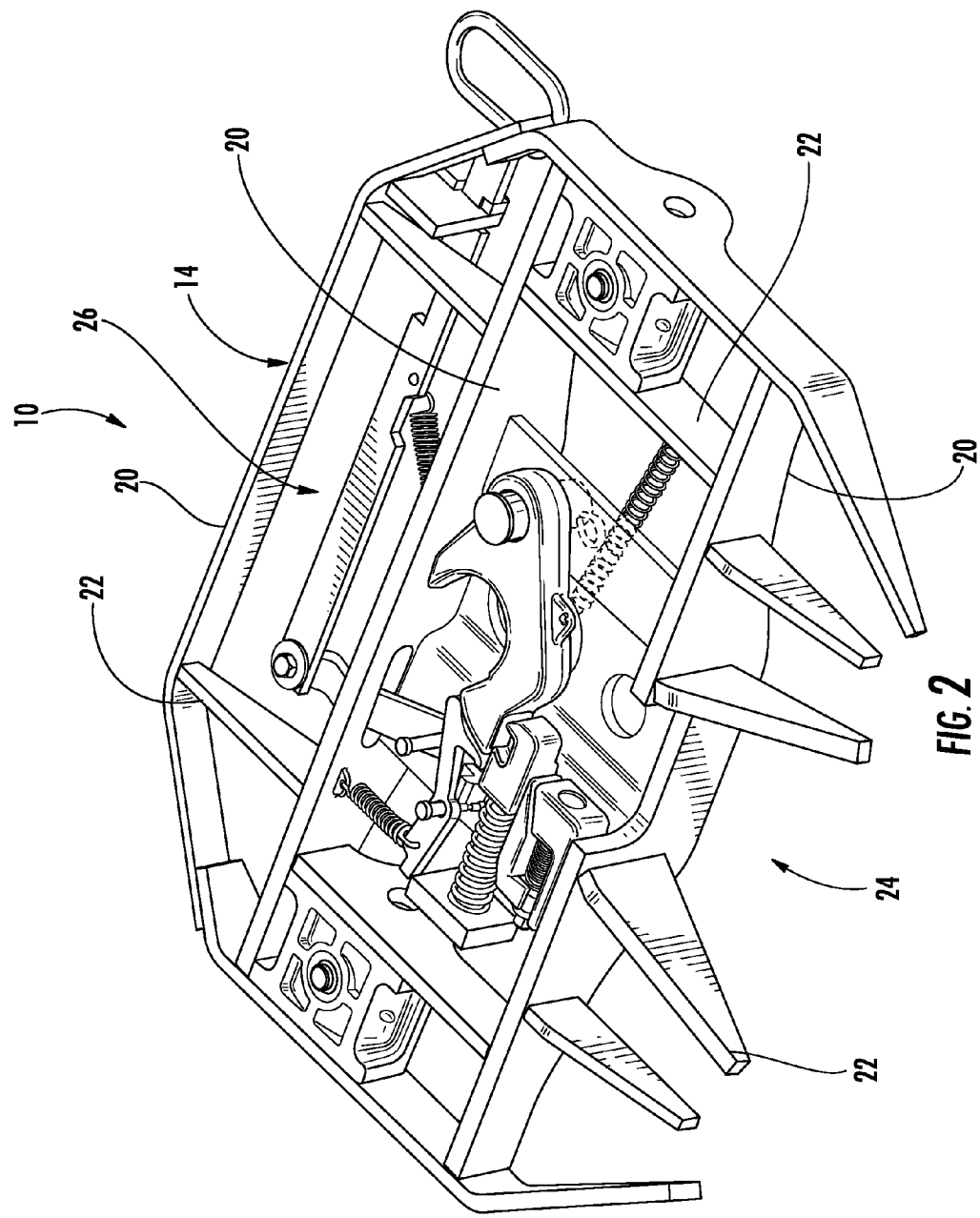
FIG. 2 is a top perspective view of the fifth wheel hitch assembly with a top plate assembly removed therefrom.

In the illustrated example, the fifth wheel hitch assembly 10 includes a top plate assembly 12 supported by a frame assembly 14 (FIG. 2). The top plate assembly 12 includes an outer top plate 16 and an inner top plate 18. The frame assembly 14 includes a plurality of lateral members 20 and a plurality of longitudinal members 22 weldably secured to one another to form a supporting structure. A plurality of the rear-most longitudinal members 22 cooperate with the top plate assembly 12 to form a relief or throat 24 within which a kingpin is received.

Figure 4:
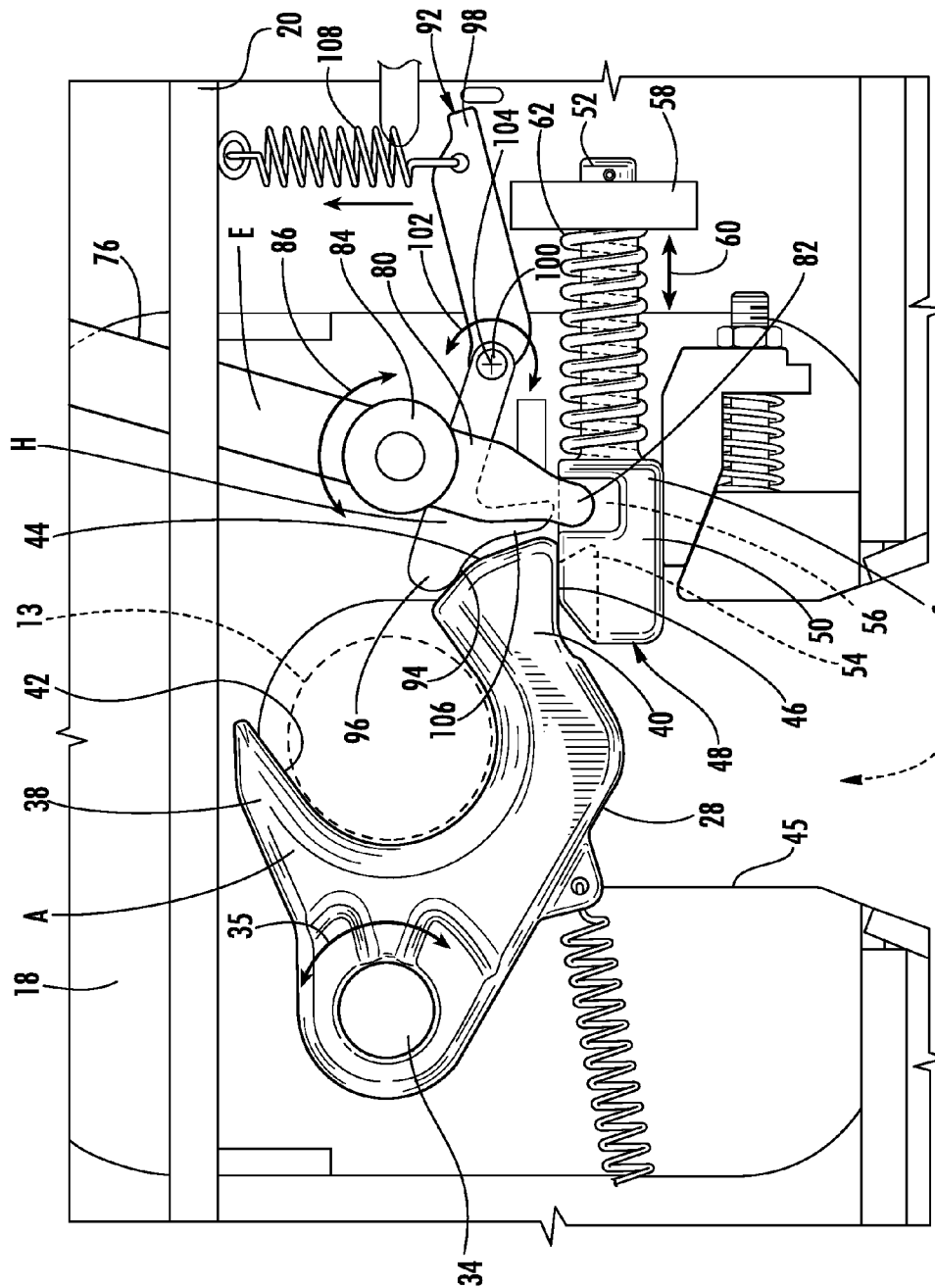
FIG. 4 is an enlarged bottom plan view of the fifth wheel hitch assembly, wherein a latch assembly is shown in a locked position.
Figure 5:
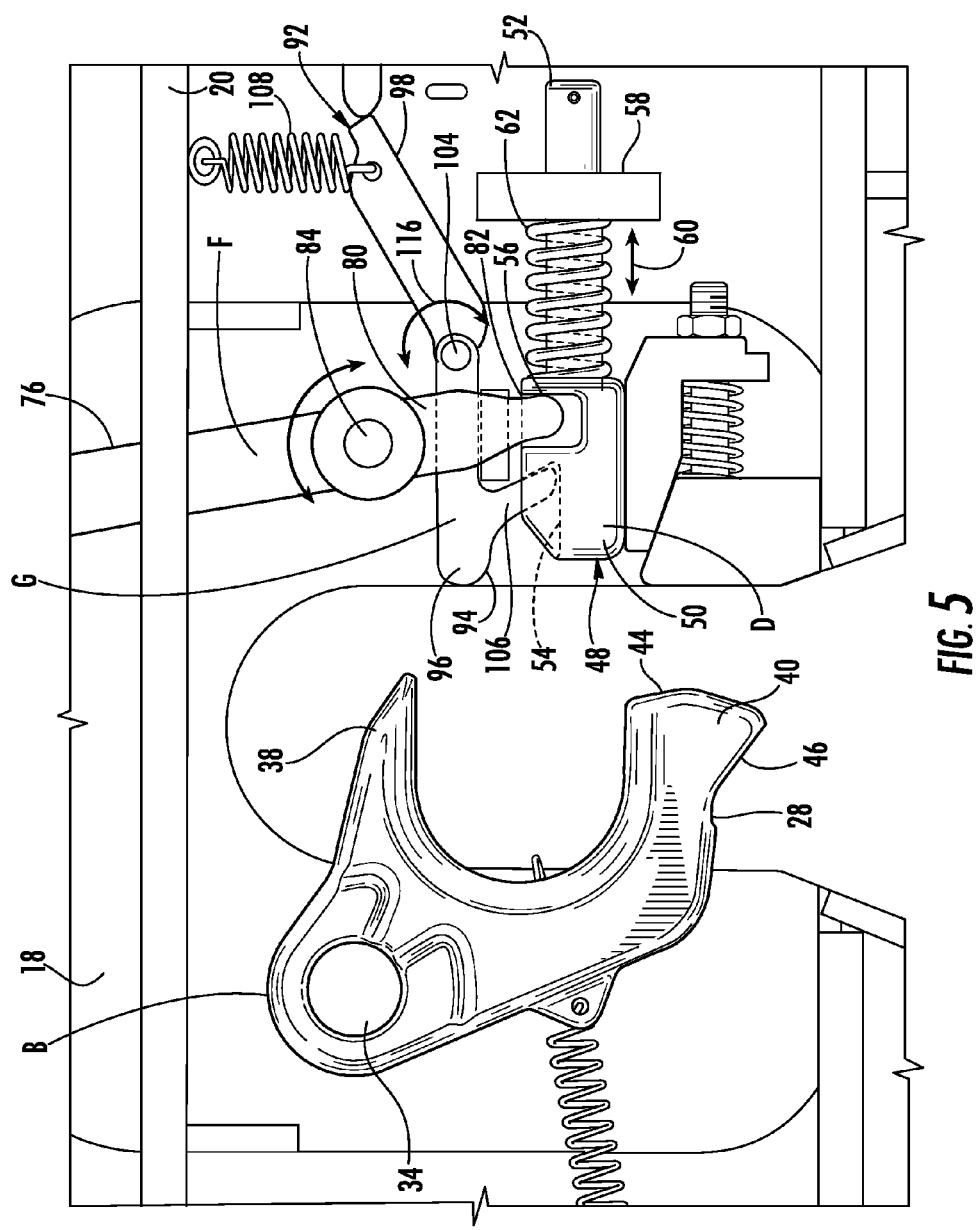
FIG. 5 is an enlarged bottom plan view of the fifth wheel hitch assembly, wherein a latch assembly is shown in an unlocked position.

The fifth wheel hitch assembly 10 (FIG. 3) further includes a latch assembly 26 that serves to secure a kingpin 13 within the throat 24, thereby coupling a towing vehicle associated with the fifth wheel hitch assembly 10 with a towed vehicle or trailer associated with the kingpin 13. The latch assembly 26 includes a generally C-shaped latch member 28 pivotally coupled to the inner top plate 18 and a lower plate 32 by a pivot pin 34 for rotation about a pivot axis 36. The latch member 28 includes a pair of fingers including an inner finger 38 and an outer finger 40 that cooperate to form a kingpin-receiving recess 42. As best illustrated in FIG. 4, the outer finger 40 includes a cammed surface 44 and a stop surface 46. The latch member 28 is movable between a locked position A, as illustrated in FIG. 4, wherein the latch member 28 is adapted to retain the kingpin within the relief 24, and an unlocked position B, as shown in FIG. 5, wherein the kingpin 13 may be removed from within the relief 24. A coil spring 45 biases the latch member towards the unlocked position B.

The latch assembly 26 further includes a plunger member 48 having an engagement head 50 and a shaft portion 52. The engagement head 50 includes a locking relief 54 and an actuator relief 56. The shaft portion 52 is slidably received within a standup 58 grounded with respect to the frame assembly 14, such that the plunger member 48 is movable with respect to the remainder of the fifth wheel hitch assembly 10 in a linear path 60 between an engaged position C, as shown in FIG. 4, wherein the plunger member 48 engages the latch member 28, thereby preventing the latch member 28 from being moved from the locked position A to the unlocked position B, and a disengaged position D, as shown in FIG. 5, wherein the latch member 28 may be moved from the locked position A to the unlocked position B. A coil spring 62 is located between the standup 58 and the engagement head 50 of the plunger member 48, thereby biasing the plunger member 48 towards the engaged position C.

An actuator assembly 64 includes a first linkage 67 having a first end 68 fixedly coupled to a handle member 70, and a second end 62 pivotally coupled to the first end 74 of a second linkage 76 at a pivot point 78. A second end 80 includes a pawl portion 82 operably received within the actuator relief 56 of the plunger member 48. The second linkage 76 is pivotally coupled to the inner top plate 18 and lower plate 32 by a pivot pin 84 such that the second linkage 76 pivots in a direction 86 as the first linkage 66 is moved through a linear guide member 87 in a linear path 88. The rotational movement of the second linkage 76 in a direction 86 causes the pawl portion 82 of the second linkage 76 to act on the plunger member 48, thereby moving the plunger member 48 in the direction 60. Specifically, the actuator assembly is movable between a coupled position E, as shown in FIG. 4, wherein the actuator assembly moves the plunger member 48 into the engaged position C, and a coupling position F, as shown in FIG. 5, wherein the actuator assembly 64 moves the plunger member 48 to the disengaged position D.

The latch assembly 26 further includes a locking member 92 having a first end 96 that includes a cam abutment surface 94, and a second end 98. In the illustrated example, the locking member comprises a single, integral piece. A pivot pin 100 pivotally couples the locking member 92 to the lower plate 32 and the inner top plate 48 for pivoting in a direction 102 about a pivot point 104. The locking member 92 further includes a locking pawl 106 positioned between the pivot point 104 and the first end 96. The locking member 92 is movable between a first position G, wherein the locking member 92 engages the locking relief 54 of the plunger member 48, thereby preventing the plunger member 48 from being moved from the disengaged position D to the engaged position C, and a second position H, as shown in FIG. 4, wherein the locking pawl 106 is disengaged from within the locking relief 54 of the plunger member 48, thereby allowing the plunger member 48 to be moved from the disengaged position D to the engaged position C. A coil spring extends between the second end 98 of the locking member 92 and a lateral member 20 of the frame assembly 14, thereby biasing the locking member 92 from the second position H towards the first position G.

Figure 6:
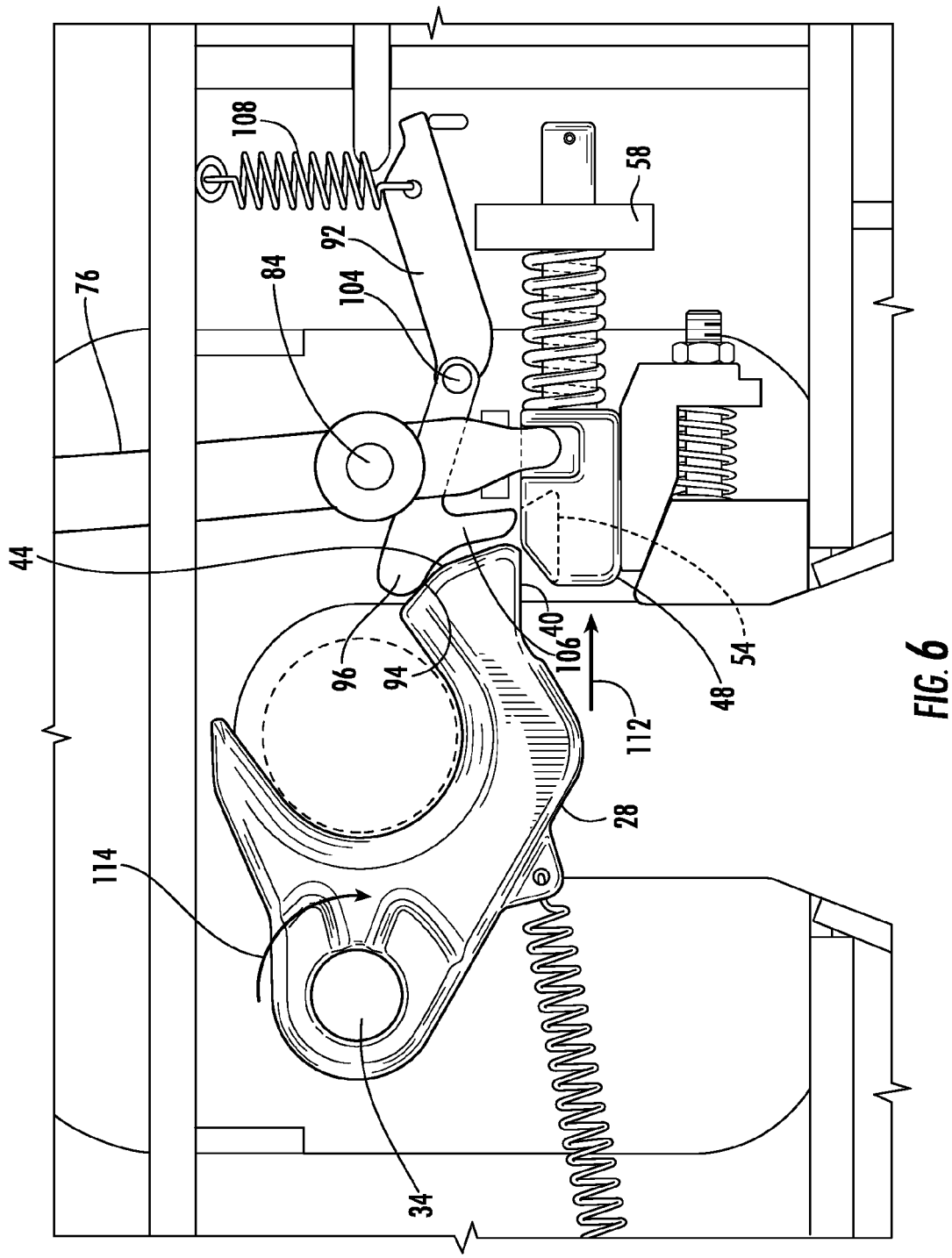
FIG. 6 is an enlarged bottom plan view of the fifth wheel hitch assembly, wherein the latch assembly is shown in an intermediate position, wherein a latch member abuts a locking member and the locking member is in an unlocked position.
Figure 7:
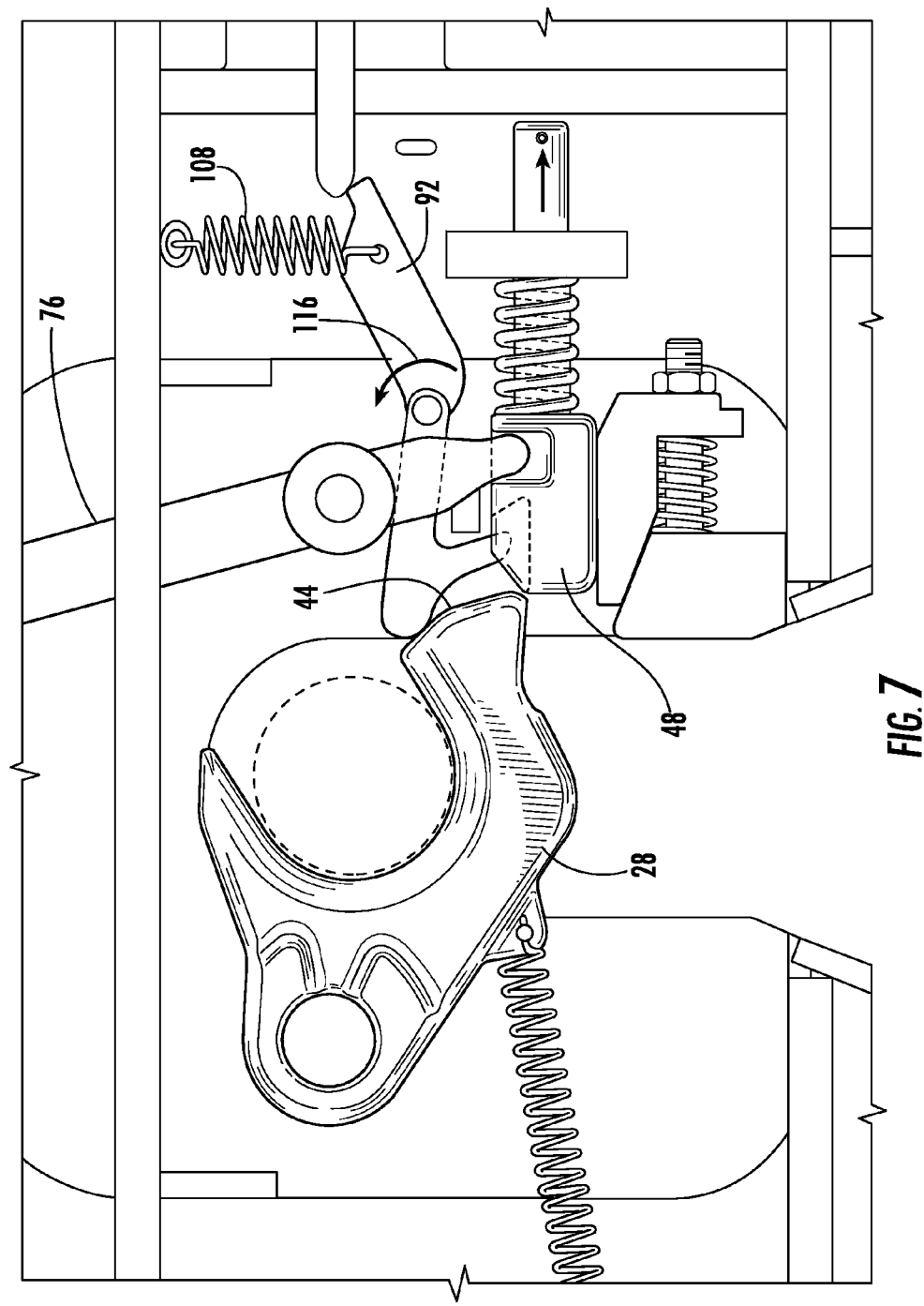
FIG. 7 is an enlarged bottom plan view of the fifth wheel hitch assembly, wherein the latch assembly is shown in an intermediate position.
Figure 8:
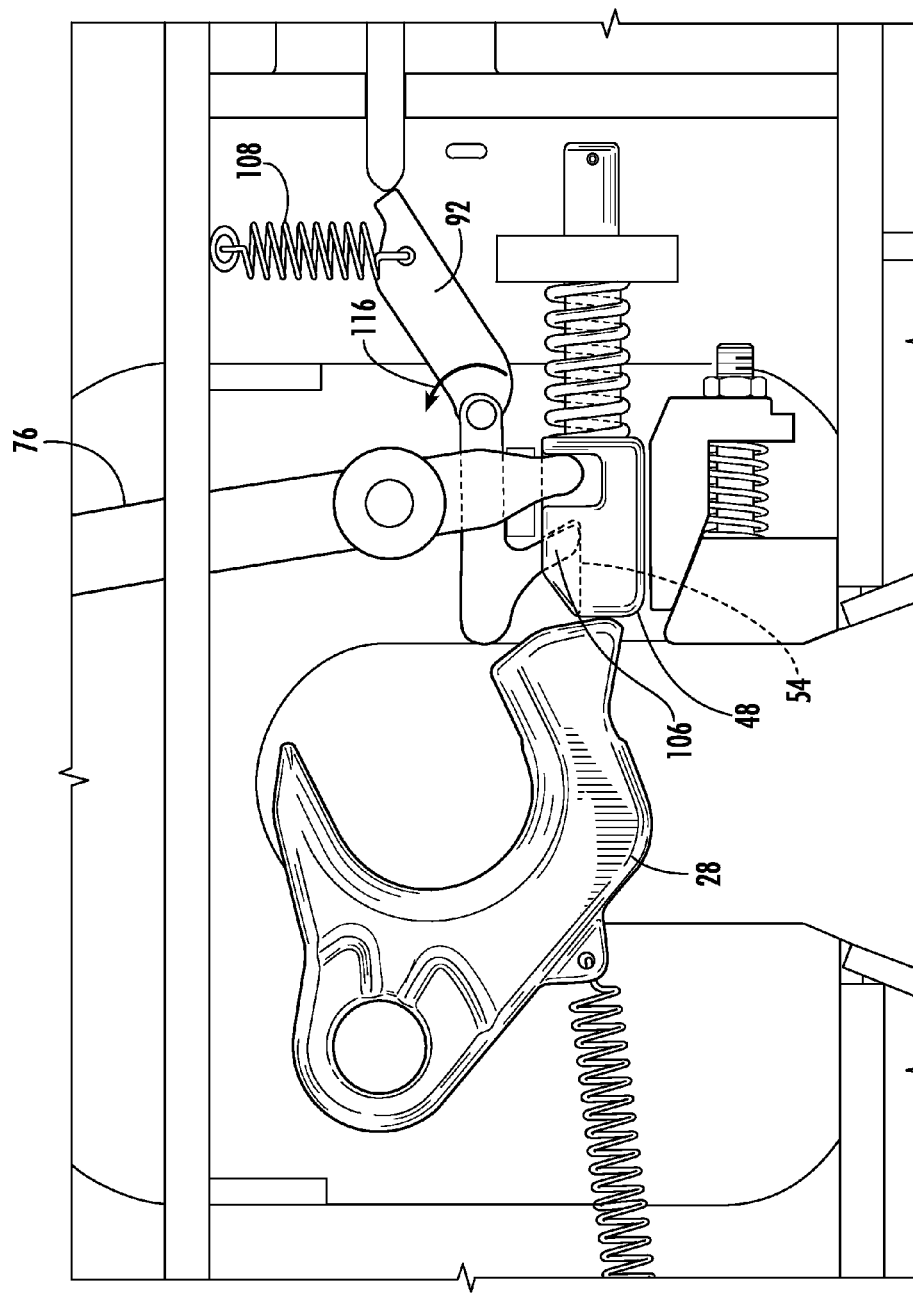
FIG. 8 is an enlarged bottom plan view of the fifth wheel hitch assembly, wherein the latch assembly is shown in an intermediate position, wherein the latch member abuts a plunger member.
Figure 9:
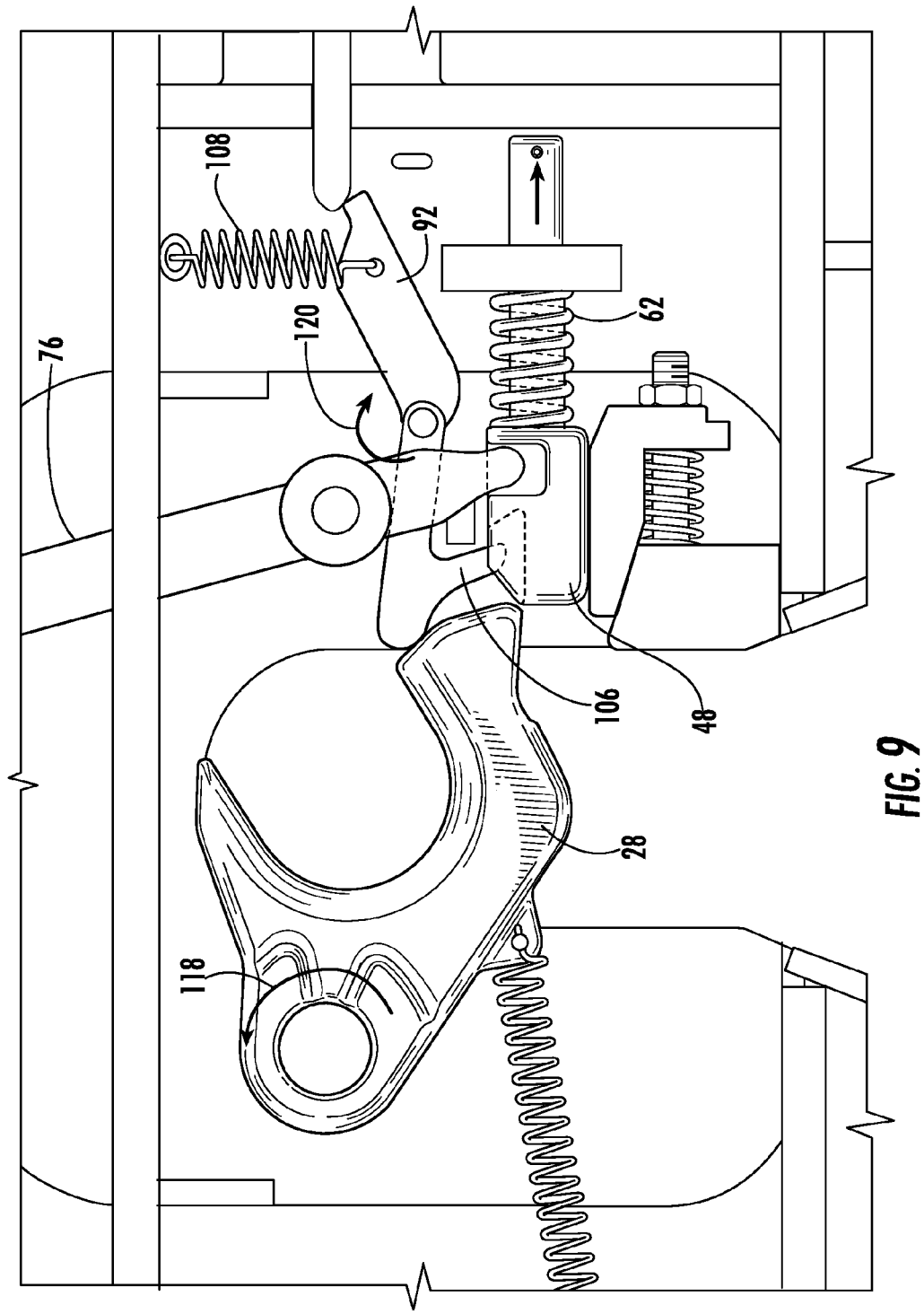
FIG. 9 is an enlarged bottom plan view of the fifth wheel hitch assembly, wherein the latch assembly is shown in an intermediate position.
Figure 10:
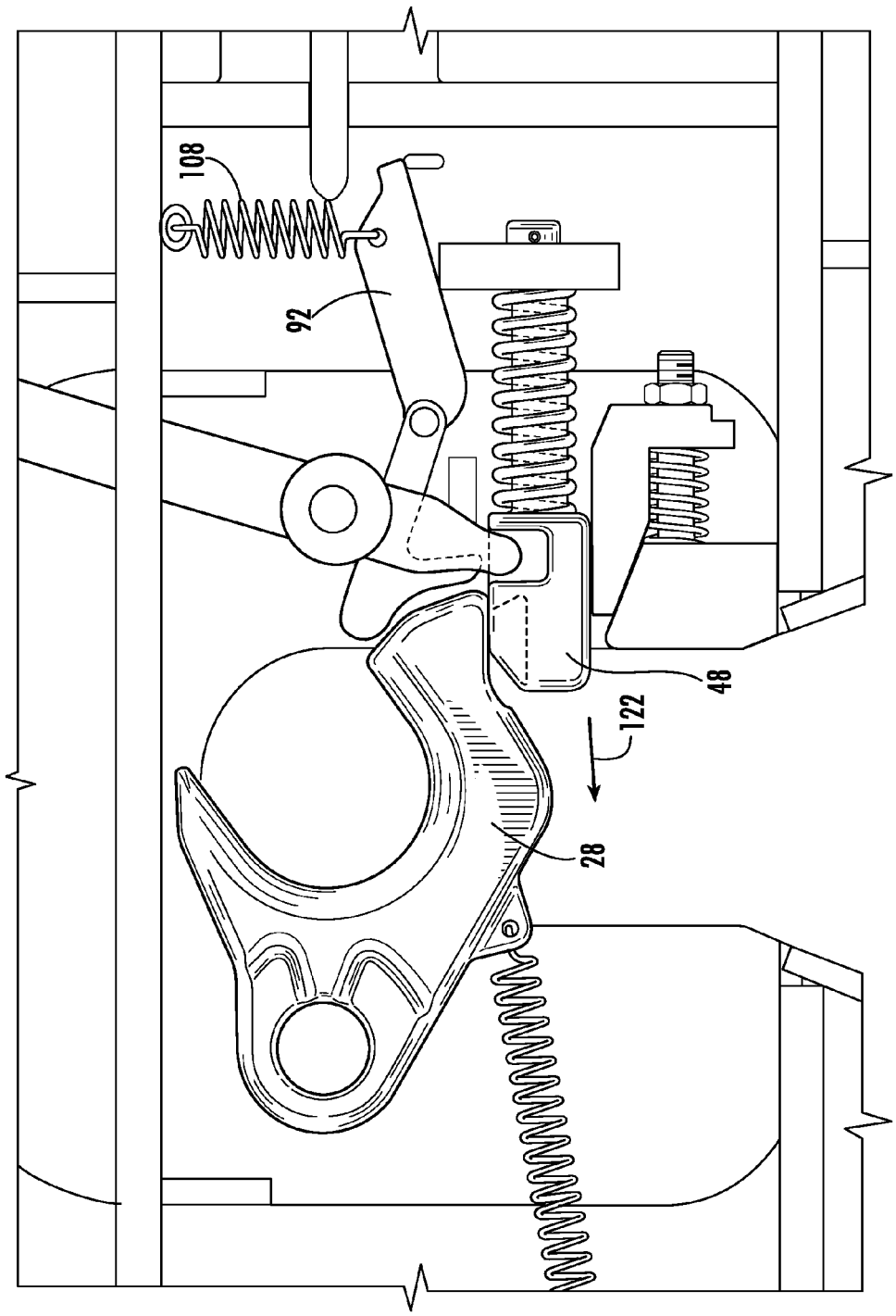
FIG. 10 is an enlarged bottom plan view of the fifth wheel hitch assembly, wherein a latch assembly is shown in an unlocked position.

In operation, the fifth wheel hitch assembly 10 may be coupled and uncoupled with the kingpin 13 by moving the latch member 28 from the locked position A (FIG. 4) to the unlocked position B (FIG. 5), thereby allowing the kingpin to enter into and be withdrawn from the throat 24. Specifically, an operator grasps the handle 70 and pulls outwardly in a direction 110, thereby causing the pawl portion 82 to act on the plunger member 48 and move the plunger member 48 in the direction 112 (FIG. 6), until the plunger member 48 is clear of the latch member 28, thereby allowing the latch member 28 to move in a direction 114 from the locked position A to the unlocked position B. As the latch member 28 moves from the locked position A to the unlocked position B (FIG. 7), the cammed surface 44 of the latch member 28 abuts the plunger member 48, as shown in FIG. 8, thereby temporarily forcing the plunger member 48 to the unengaged position D. As the latch member 28 continues to rotate, the cammed surface 44 moves free of the cam abutment surface 94 of the locking member 92, thereby allowing the locking member 92 to be biased in the direction 116 by the spring 108 until the locking pawl 106 is received within the locking relief 54 engagement head 50 of the plunger member 48, thereby retaining the plunger member 48 in the unengaged position D. The latch member 28 continues to rotate in the direction 114 until the recess 42 of the latch member 28 is sufficiently aligned with the throat 24 so as to allow ingress or egress of the kingpin 13. The latch member 26 may then be returned from the unlocked position B to the locked position A by moving the kingpin 13 into the throat 24 until the kingpin 13 exerts a force on the inner finger 38 of the latch member 28, thereby forcing the latch member 28 to rotate in a direction 118 (FIG. 9). As the latch member 28 rotates from the unlocked position B to the locked position A, the cammed surfaced 44 of the latch member 28 once again abuts the cam abutment surface 94 of the locking member 92, thereby forcing the locking member 92 to rotate in a direction 120 and disengaging the locking pawl 106 from within the locking relief 54 of the plunger member 48. Once the cammed surface 44 of the latch member 28 is clear of the engagement head 50 of the plunger member 48, the biasing spring 62 forces the plunger member from the unengaged position D to the engaged position C in a direction 122 (FIG. 10).

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A latch assembly adapted to operably couple to a fifth wheel hitch plate and adapted to engage a kingpin, the latch assembly comprising:
   a latch member movable between a locked position, wherein the latch member is adapted to retain the kingpin within a relief of the fifth wheel hitch plate, and an unlocked position, wherein the kingpin may be removed from within the relief of the fifth wheel hitch plate;
   a plunger member movable between an engaged position, wherein the plunger member engages the latch member, thereby preventing the latch member from being moved from the locked position to the unlocked position, and an unengaged position, wherein the latch member may be moved from the locked position to the unlocked position;
   an actuator assembly movable between a coupled position, wherein the actuator assembly moves the plunger member to the engaged position, and an uncoupled position, wherein the actuator assembly moves the plunger member to the disengaged position;
   a locking member movable between a first position, wherein the locking member engages the plunger member, thereby preventing the plunger member from being moved from the disengaged position to the engaged position, and a second position, wherein the locking member is disengaged from the plunger member allowing the plunger member to be moved from the disengaged position to the engaged position; and
   a biasing member that exerts a biasing force that biases the locking member from the second position to the first position;
   wherein the latch member abuts the locking member to overcome the biasing force as the latch member is moved from the unlocked position to the locked position, thereby moving the locking member from the first position to the second position.

2. The latch assembly as defined in claim 1, wherein the biasing member is a coil spring.

3. The latch assembly as defined in claim 2, wherein the coil spring is coupled to an end of the locking member.

4. The latch assembly as defined in claim 1, wherein the latch member includes a cam surface that abuts a cam surface of the locking member to move the locking member from the first position to the second position as the latch member is moved from the unlocked position to the locked position.

5. The latch assembly as defined in claim 1, wherein the plunger member is biased from the disengaged position to the engaged position by a second biasing member.

6. The latch assembly as defined in claim 1, wherein the latch member is biased from the locked position to the unlocked position by a third biasing member.

7. The latch assembly as defined in claim 1, wherein the actuator member includes a graspable handle.

8. The latch assembly as defined in claim 7, wherein the actuator member includes a locking assembly that selectively prevents to the actuator member from being moved from the coupled position to the coupling position.

9. A fifth wheel hitch assembly, comprising:
   a fifth wheel hitch plate having a relief adapted to receive a kingpin therein;
   a latch assembly operably coupled to the fifth wheel hitch plate and adapted to engage the kingpin, the latch assembly comprising:
      a latch member movable between a locked position, wherein the latch member retains the kingpin within the relief of the fifth wheel hitch plate, and an unlocked position, wherein the kingpin may be removed from within the relief of the fifth wheel hitch plate;
      a plunger member movable between an engaged position, wherein the plunger member engages the latch member, thereby preventing the latch member from being moved from the locked position to the unlocked position, and an unengaged position, wherein the latch member may be moved from the locked position to the unlocked position;
      an actuator assembly movable between a coupled position, wherein the actuator assembly moves the plunger member to the engaged position, and an uncoupled position, wherein the actuator assembly moves the plunger member to the disengaged position;
      a locking member movable between a first position, wherein the locking member engages the plunger member, thereby preventing the plunger member from being moved from the disengaged position to the engaged position, and a second position, wherein the locking member is disengaged from the plunger member allowing the plunger member to be moved from the disengaged position to the engaged position; and
      a biasing member that exerts a biasing force that biases the locking member from the second position to the first position; and
      wherein the latch member abuts the locking member to overcome the biasing force as the latch member is moved from the unlocked position to the locked position, thereby moving the locking member from the first position to the second position.

10. The fifth wheel hitch assembly as defined in claim 9, wherein the biasing member is a coil spring.

11. The fifth wheel hitch assembly as defined in claim 10, wherein the coil spring is coupled to an end of the locking member.

12. The fifth wheel hitch assembly as defined in claim 9, wherein the latch member includes a cam surface that abuts a cam surface of the locking member to move the locking member from the first position to the second position as the latch member is moved from the unlocked position to the locked position.

13. The fifth wheel hitch assembly as defined in claim 9, wherein the plunger member is biased from the disengaged position to the engaged position by a second biasing member.

14. The fifth wheel hitch assembly as defined in claim 9, wherein the latch member is biased from the locked position to the unlocked position by a third biasing member.

15. The fifth wheel hitch assembly as defined in claim 9, wherein the actuator member includes a graspable handle.

16. The fifth wheel hitch assembly as defined in claim 9, wherein the actuator member includes a locking assembly that selectively prevents to the actuator member from being moved from the coupled position to the coupling position.

* * * * *